June 1, 1965   J. C. PIÉCHON   3,186,876
SEPARATORS FOR ELECTROLYTIC CELLS
Filed April 10, 1962
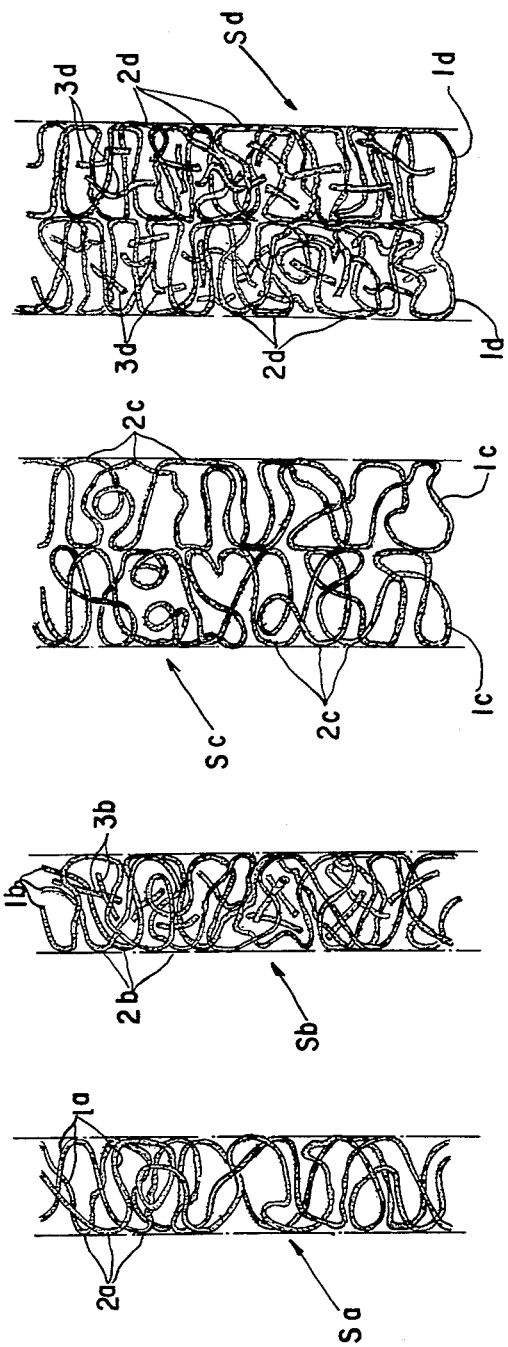
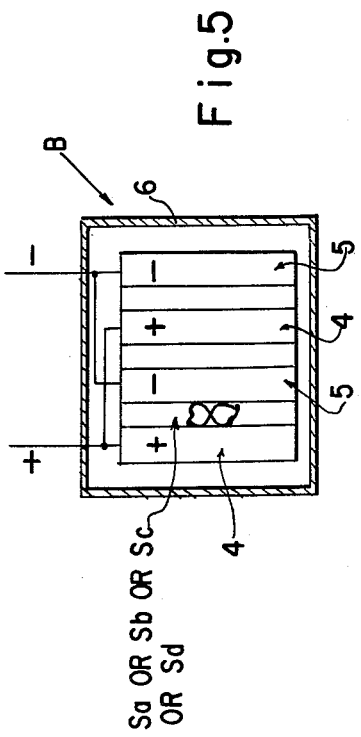
INVENTOR
JEAN CLAUDE PIÉCHON
BY
ATTORNEYS

United States Patent Office 3,186,876
Patented June 1, 1965

3,186,876
SEPARATORS FOR ELECTROLYTIC CELLS
Jean Claude Piéchon, Chatillon-sous-Bagneux, France, assignor to Societe des Accumulateurs Fixes et de Traction (Societe Anonyme), Romainville, France, a company of France
Filed Apr. 10, 1962, Ser. No. 186,396
Claims priority, application France, June 12, 1961, 864,691
8 Claims. (Cl. 136—143)

The present invention relates to separators for electric storage cells or similar apparatus, to their method of manufacture and to electric cells embodying such separators.

A principal object of the present invention is a method for manufacturing separators used in acid or alkaline electric storage cells, electrolytic cells, primary cells, special primary cells and deferred-action cells and so on. The said process is of the kind according to which the said separator is constituted by a non-woven fabric made of tangled or felted fibers unaltered by the electrolyte used in the cell, which, however, is capable of swelling in such electrolyte.

A prior co-pending patent application, Serial No. 166,780, filed January 17, 1962, has already described a separator specifying the fact that it was characterized by a high porosity or a very large pore volume, thus retaining a great amount of electrolyte by capillary forces.

Such a separator was constituted by felting or tangling of synthetic fibers, e.g. made of polyamides, such as nylon or polypropylene, said fibers being short so that their tips may lie flush with the outer surfaces of the separator and be in contact with the electrodes.

Said separators have been found to be very satisfactory as long as they were used in cells which were intended to remain essentially fixed, i.e. which were not to be subjected to jerks or to acceleration effects. But it was found that in certain conditions, the capillary retention of electrolyte by the separator was not sufficient so that the distribution of the electrolyte was no longer homogeneous. As an example, when the cells containing such separators were subjected to accelerations, the electrolyte had a tendency not only to move in the body of the separator, but to be expelled from it when the forces thus created became higher than the capillary forces of retention. Moreover, this expulsion of electrolyte was, in a manner, promoted by the numerous fiber tips terminating at the surfaces of the separator where there was practically no retention of electrolyte.

An object of the method according to the present invention is to remedy these drawbacks. It is more especially characterized in that the felting and tangling of the fibers are made in such a way that loops able to retain the electrolyte by capillary forces are created on the surfaces of the separator which are to be in contact with the electrodes.

According to another characteristic of the invention, long fibers are used for making the said loops.

According to still another characteristic of the invention, the said fibers may be all of the same kind or a mixture of different kinds.

It will be seen that due to the practice of the present invention by the elimination of the tips or ends of the fibers which in the earlier separator were flush with the outer surfaces of the separator and by the substitution of loops in their stead, the open capillary channels by which the electrolyte could escape are eliminated. Thus, the capillary forces in the separators of this invention retaining the electrolyte may operate and prevent the latter from being expelled from such separators as a result of the accelerating or jerking phenomena which have been described above.

It is to be understood that another object of the invention are the separators obtained by the said method, more especially notable in that they constitute one or several layers of the said non-woven fabric in which at least some of the fibers form loops on the outer surfaces intended to be in contact with the contiguous surfaces of the electrodes.

Still other objects of the invention as new industrial products, are acid or alkaline storage cells, primary or secondary cells and all other articles making use of the separators of the invention.

Other objects and features of this invention will become apparent from the following specification and the accompanying drawings forming a part thereof, wherein:

FIGURE 1 is a partially diagrammatic view of a separator embodying this invention;

FIGURE 2 is a similar view of a modified embodiment;

FIGURE 3 is a similar view of a further modified embodiment;

FIGURE 4 is a similar view of still another embodiment, and

FIGURE 5 is a diagrammatic sectional view of an electric battery embodying separators of this invention.

The method according to the invention may be realized in several different ways. What is essential is to obtain loops of fibers principally distributed on the outer surfaces of the one or several fabric layers constituting the separator. Said loops may be created by using fibers of synthetic material, e.g. polyamides such as nylon, polypropylene, or other synthetics that will not be affected by the electrolyte of the cell in which the separators are used, the length of which is greater than the conventional length used in known methods. Those long fibers may be used exclusively or with the conventional ones. It is merely necessary to take care that their length is at least about 25 to a hundred (100) times the length of the cut fibers in common use. Thus, for instance, long fibers 500 mm. long and more have been found quite suitable. Thus, in FIGURE 1, a single layer separator $S_a$ is made by using tangled, felted, long, synthetic fibers $1a$ of the type mentioned, which form loops $2a$ at the outer surfaces of the separator. In the alternative, as seen in FIGURE 2, the separator $S_b$ utilizes tangled long fibers $1b$ mixed with conventional shorter length fibers of the same or different material. The loops $2b$ of the long fibers lie at the outer surfaces of the separator. Fibers $1b$ are 25–100 times longer than fibers $3b$.

It is already known that for manufacturing felted fabrics, i.e. non-woven fabrics which look like blotting paper without woof or warp, the fibers are first cut to a suitable length, which is one or several centimeters, e.g. two to three cm. After the cutting operation, they are felted by known processes, such as by throwing them on rotating rollers constituting a rolling-mill, eventually providing for glueing or bonding means in contact with the cross-over locations of the fibers. Any appropriate bonding or glueing agent may be used for this purpose. The known felting processes and apparatus may be used in preparing separators $S_a$ or $S_b$ of this invention, the long fibers $1a$ or mixtures of long fibers $1b$ and short fibers $3b$ being thrown onto the rollers of the rolling mill. This throwing operation causes the long fibers to form loops that dispose themselves at the outer surfaces of the separators during the entanglement and felting of the fibers.

By operating according to the teachings of the present invention, non-woven fabric separators $S_a$ or $S_b$ are obtained, said non-woven fabrics or separators possessing only a very small number of fibers whose ends or tips may appear flush with the outer surfaces. Compared with the separator disclosed in the said prior patent application, the number of such fiber tips is in a ratio of only about 1 to 50. Separators $S_a$ or $S_b$ may be utilized in single layers or assembled in a plurality of layers for use in a cell. Each layer is preferably less than 0.4 mm. and preferably in the range of from 0.05 to 0.2 mm. thick, the total thickness of a group of layers should preferably not exceed 0.4 mm.

According to another embodiment as seen in FIGURES 3 and 4, instead of using cut, though long figers of the material mentioned, continuous i.e. uncut fibers $1c$ or $1d$ may be used, said fibers $1c$ or $1d$ being directly supplied from any suitable source, such as a spool (not shown) and are thrown on the rollers of the rolling mill for entanglement and felting; the continuous fibers $1c$ or $1d$ being either mixed with short fibers $3d$ or exclusively used as seen respectively in FIGURES 3 and 4 to form separate layers which are then assembled to provide multi-layer separators $S_c$ or $S_d$, or which layers may be used separately as separators, whose loops $2c$ or $2d$ are disposed at the outer surfaces of the separators.

The method may be applied further by simultaneously using several continuous fiber threads coming from several different spool sources which are thrown onto the rollers of the rolling mill. In such conditions, several spools simultaneously supply different continuous lengths of fibers which are thrown on the rollers as is the usual way of operating. Of course, the fibers coming from several different spool sources may also be of different kinds, some being synthetic fibers of the type mentioned and others, if desired, being cellulosic or other desirable fibers. The loops arrange themselves at the outer surfaces of the separators during entanglement and felting.

It is also possible in such conditions to reduce the glueing or bonding of the cross-over locations of the fibers together in such proportion that it becomes negligible. It is even sometimes advantageous to do away with glueing or bonding completely.

With whatever mode of felting, the separators $S_c$ and $S_d$ thus obtained possess remarkable electrolyte retaining properties. Such separators may be advantageously used in storage cells which are to operate under very severe conditions, as is the case of those used in moving appliances, subject to very strong accelerations. Such separators $S_c$ and $S_d$ likewise may be multi-layered as shown or single layered, with the same layer thickness as separators $S_a$ and $S_b$.

Tests made with such separators have given extremely favorable results.

For example, two separators have been prepared by known felting processes, one with polyamid fibers 2.5 cm. long and the other with continuous, i.e. uncut fibers or threads made of the same kind of polyamid having a plurality of loops disposed at their outer surfaces. Samples of these separators were impregnated with electrolyte made of a 5 M potassium hydroxide solution, weighed, and then subjected to centrifugation giving an acceleration of 20 $g$ ($g$ being the acceleration due to gravity). The length of such test was three minutes. After the test, the samples were again weighed and it was found that the separators made with cut fibers had lost from 25 to 30% of the original impregnated electrolyte, whereas only 2 to 4% had been lost in separators made with the long or continuous fibers.

This remarkable result proves that the capillary forces retaining the electrolyte have been very substantially increased.

The fibers (long or long and short) used may, of course, be natural or synthetic and as indicated above, may be of different or identical kinds, their length when they are cut may be chosen in a very large range, whereas the number of fibers used, if they are continuous, i.e. uncut, may also differ according to the needs.

Separators $S_a$, $S_b$, $S_c$ or $S_d$ may be used as shown in FIGURE 5, in preparing a storage battery B, being interposed between adjacent electrodes 4 and 5 of different polarity. The electrodes are, for example, of conventional sintered types or any other types. The required kind of electrolyte, for example, potassium hydroxide in the case of an alkaline battery is incorporated as needed. The separators swell when the electrolyte is added. The assembled electrodes and separators are mounted in a suitable casing 6 that may, if desired, be sealed. The loops $2a$, $2b$, $2c$ or $2d$ of such separators at their outer surfaces engage the contiguous surfaces of the electrodes 4 and 5 between which they lie.

It is well understood that the invention is in no way limited to the embodiments that have been described and given only as examples. Variations in detail within the scope of the appended claims are possible and are contemplated. There is no intention of limitation to the exact disclosure herein made.

What is claimed is:

1. In an electrolytic cell having an alkaline electrolyte and electrodes of opposite polarity, the separator interposed between the electrodes comprising long, entangled, felted fibers which are chemically resistant to the electrolyte, said fibers forming a plurality of loops at the outer surfaces of the separator in contact with the contiguous surfaces of the electrodes, said separator being adapted to swell in said electrolyte.

2. The separator of claim 1 wherein the long, entangled, felted fibers are of continuous length.

3. The separator of claim 1 wherein said fibers are at least 500 mm. long.

4. The separator of claim 1 wherein said long, entangled, felted fibers are intermixed with shorter cut fibers and are 25 to 100 times the length of the shorter cut fibers.

5. In an electrolytic cell having alkaline electrolyte and electrodes of opposite polarity, a multiple layer separator interposed between the electrodes, each layer of said separator comprising long, entangled felted fibers which are chemically resistant to the electrolyte, said fibers in each layer forming a plurality of loops at the outer surfaces of such layer with the loops at the outer surfaces of the outermost layers in contact with the contiguous surfaces of the electrodes, said separator being adapted to swell in said electrolyte.

6. The separator of claim 5, wherein the long, entangled, felted fibers are of continuous length.

7. The separator of claim 5 wherein said fibers are at least 500 mm. long.

8. The separator of claim 5 wherein said long, entangled, felted fibers are intermixed with shorter cut fibers and are 25 to 100 times the length of the shorter cut fibers.

References Cited by the Examiner

UNITED STATES PATENTS

| | | | |
|---|---|---|---|
| 2,336,797 | 12/43 | Maxwell | 136—146.27 |
| 2,374,540 | 4/45 | Hall | 136—146.26 |
| 2,395,371 | 2/46 | Dockerty | 136—145.6 |
| 2,842,607 | 7/58 | Germershausen et al. | 136—6.2 |
| 2,875,503 | 3/59 | Frickert et al. | 28—1 |
| 2,978,529 | 4/61 | Brisley et al. | 136—145 |
| 3,014,085 | 12/61 | Bachman | 136—146 |
| 3,085,126 | 4/63 | Labino | 136—146 |

FOREIGN PATENTS

| | | |
|---|---|---|
| 475,464 | 11/37 | Great Britain. |
| 26,882 | 10/54 | Finland. |

WINSTON A. DOUGLAS, *Primary Examiner.*

JOHN H. MACK, *Examiner.*